(No Model.)

W. S. KENYON.
CARD GRINDER.

No. 359,928. Patented Mar. 22, 1887.

Witnesses:
W. M. Bjorkman
A. B. Jenkins.

Inventor:
Winfield S. Kenyon,
by Simonds & Burdett,
attys.

UNITED STATES PATENT OFFICE.

WINFIELD S. KENYON, OF WOODSTOCK VALLEY, CONNECTICUT.

CARD-GRINDER.

SPECIFICATION forming part of Letters Patent No. 359,928, dated March 22, 1887.

Application filed October 1, 1886. Serial No. 215,045. (No model.)

*To all whom it may concern:*

Be it known that I, WINFIELD S. KENYON, of Woodstock Valley, in the county of Windham and State of Connecticut, have invented a certain new and useful Improvement in Card-Grinders, of which the following is a description, reference being had to the accompanying drawings, where—

Figure 1:
Figure 2:
Figure 3:
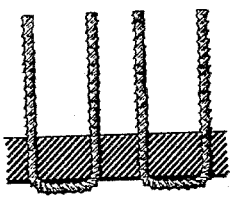

Figure 1 is a view in cross-section of a single-wire tooth, such as is hereinafter referred to, before the same is twisted, on enlarged scale. Fig. 2 is a view similar to Fig. 1, and of the same wire tooth after the tooth is twisted, on an enlarged scale. Fig. 3 is an elevation view of a few of the teeth set in a suitable base of leather or the like, on an enlarged scale.

The improved wire brush about to be described is intended for grinding purposes, for removing feather edges, hooked points, and the like from card-clothing.

The teeth of this improved wire brush are angular or of equivalent shape in cross-section. The section may be square, triangular, rectangular, or of any other equivalent shape in cross-section; but the preferable shape is that illustrated in Fig. 1, the object being to attain such a cross-section shape of the wire tooth as will, when the wire is twisted, give cutting-edges suitable for the grinding purposes already indicated. This shape, which the wire tooth must have in cross section, is referred to in the claim at the end of this specification as "angular-sectioned." These teeth are of steel wire, and before being set in the suitable base, hereinafter referred to, the wire is torsionally twisted, as indicated in Fig. 3, with the result of producing spiral lines of projection, which act as cutting-edges when used for grinding card-clothing, as already indicated. These teeth are to be set in a suitable base, much as the teeth of card-clothing are set, which base may be of leather, cloth, wood, or any other material suited to the purpose. Each tooth may be set in this suitable base by itself; but the preferred way is to have two teeth united at the bottom, the whole integral, in the way in which card-clothing teeth are commonly made, and then inserted in the base the same as card-clothing teeth are commonly inserted, a mode of construction and union indicated in Fig. 3. The base in which these teeth are set may be flat, or it may be superimposed upon a cylinder or shaped into any other convenient form. These teeth are generally intended to project from the base about one-fourth of an inch; but they may be longer or shorter, as desired, within reasonable limits, and the teeth may be of different diameters, as desired, within reasonable limits.

In using this improved wire brush for removing feather edges, hooked points, and the like from the teeth of card-clothing the teeth of the wire brush are made to intermesh with the teeth of the card-clothing.

I claim as my improvement—

A card-grinder composed of twisted angular sectioned steel wire teeth set in a suitable base, substantially as described, and for the purpose set forth.

WINFIELD S. KENYON.

Witnesses:
  ISAAC WARREN,
  MICHEAL NOUGHTIN.